A. C. GRISCOM.
SPEED CHANGING MECHANISM FOR MOTOR VEHICLES.
APPLICATION FILED FEB. 29, 1916.
1,209,147.
Patented Dec. 19, 1916.
3 SHEETS—SHEET 1.
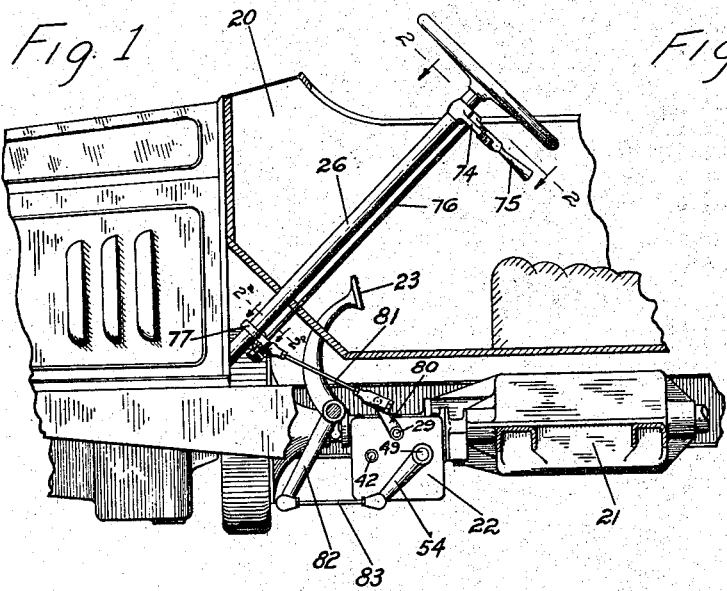
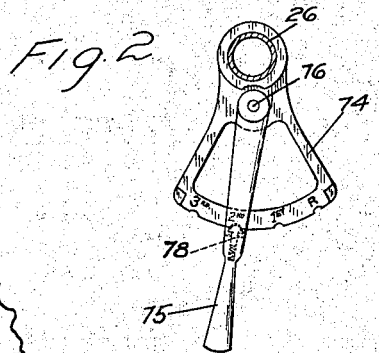
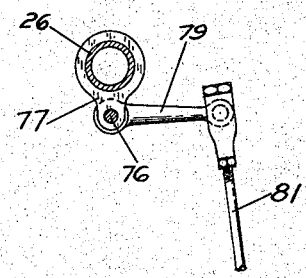
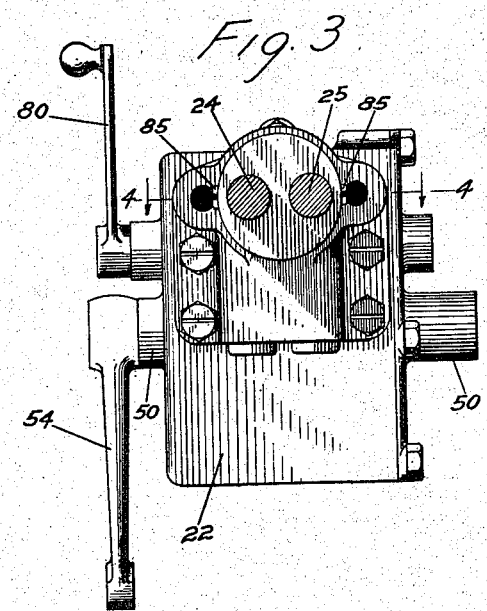
WITNESS
Chester F. Hayden.
INVENTOR
Alfred C. Griscom
BY
A. M. Wooster
ATTORNEY A. C. GRISCOM.
SPEED CHANGING MECHANISM FOR MOTOR VEHICLES.
APPLICATION FILED FEB. 29, 1916.
1,209,147.
Patented Dec. 19, 1916.
3 SHEETS—SHEET 2.
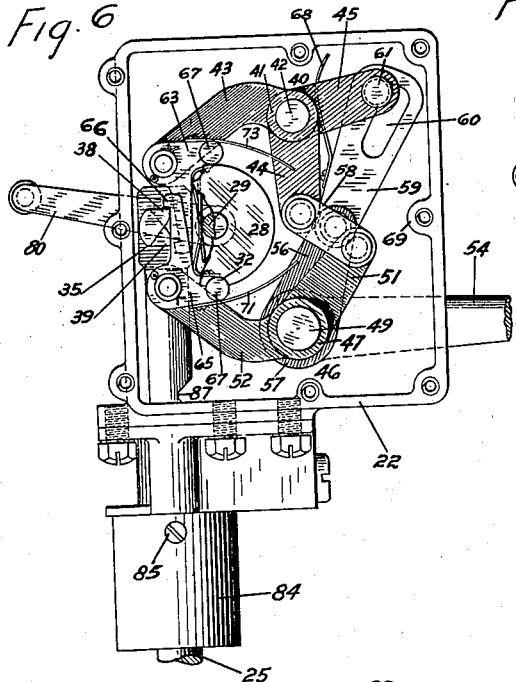
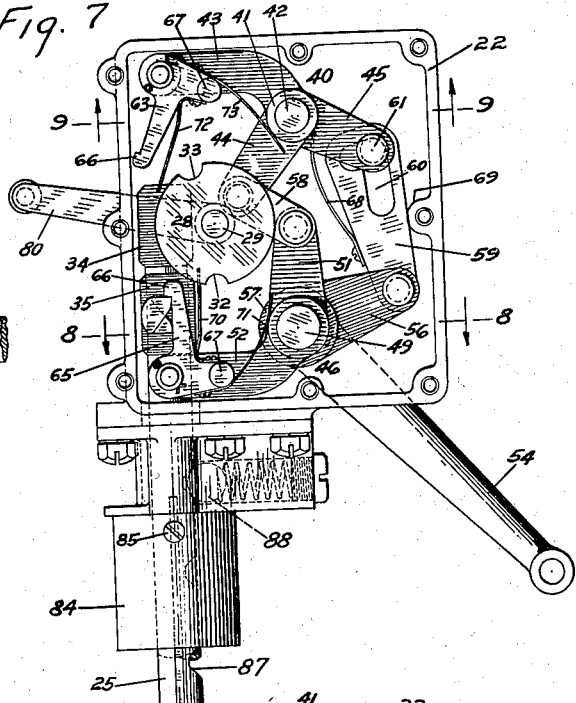
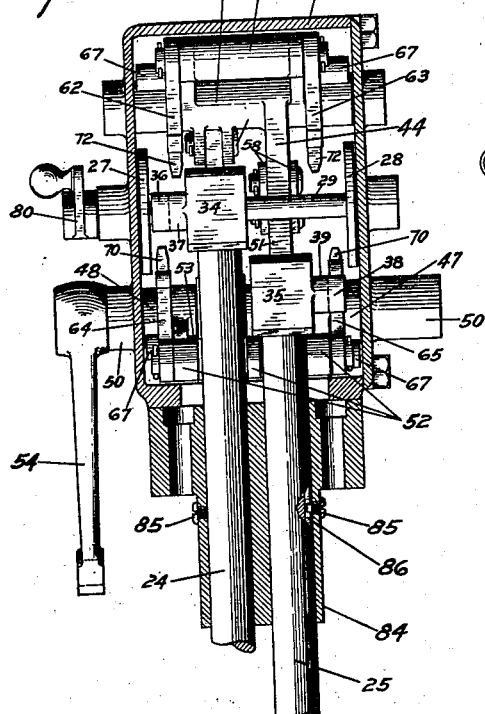
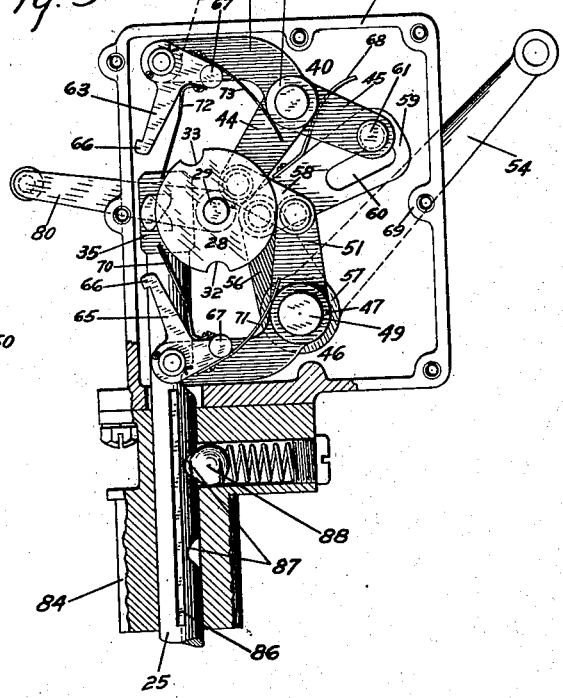
WITNESS
Lester F. Hayden.
INVENTOR
Alfred C. Griscom
BY
A. M. Broster
ATTORNEY

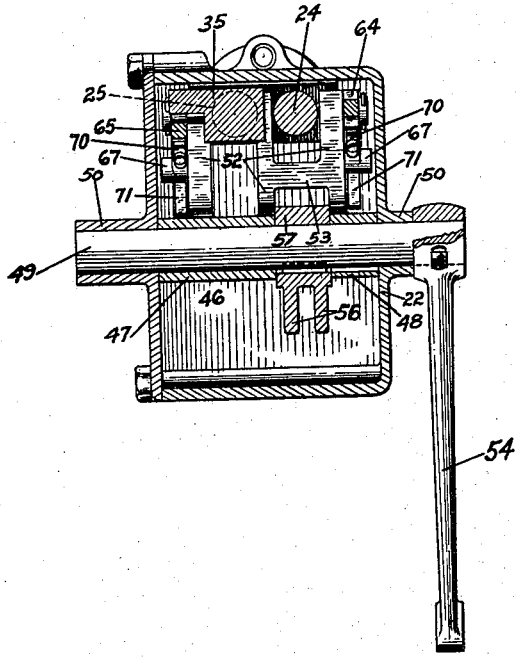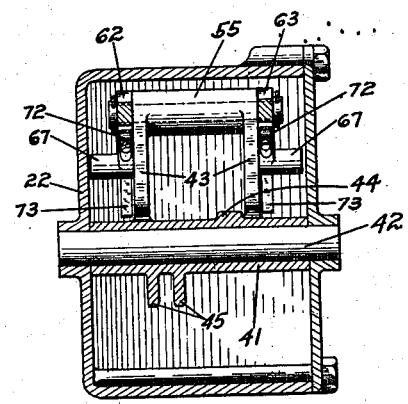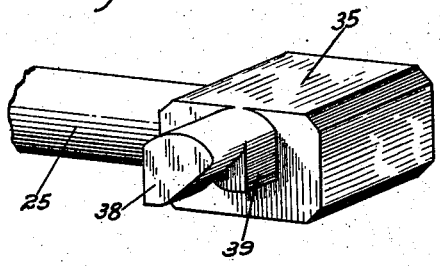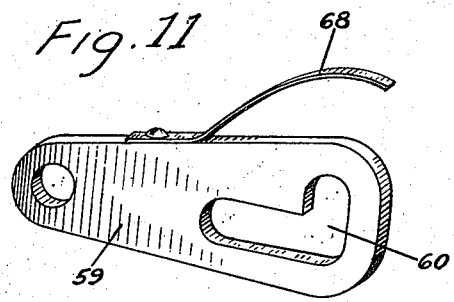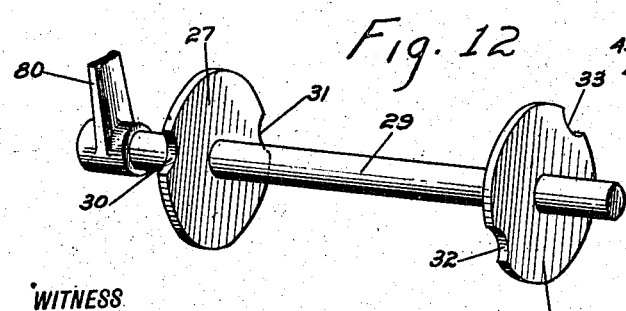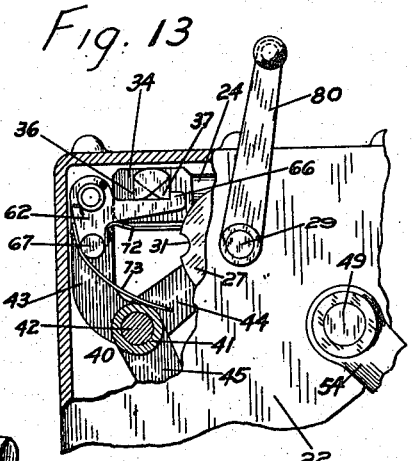

UNITED STATES PATENT OFFICE.

ALFRED C. GRISCOM, OF SANDY HOOK, CONNECTICUT, ASSIGNOR OF ONE-FOURTH TO HARRY B. CURTIS, OF BRIDGEPORT, CONNECTICUT.

SPEED-CHANGING MECHANISM FOR MOTOR-VEHICLES.

1,209,147. Specification of Letters Patent. Patented Dec. 19, 1916.

Application filed February 29, 1916. Serial No. 81,255.

*To all whom it may concern:*

Be it known that I, ALFRED C. GRISCOM, a citizen of the United States, residing at Sandy Hook, county of Fairfield, State of Connecticut, have invented an Improvement in Speed-Changing Mechanisms for Motor-Vehicles, of which the following is a specification.

This invention has for its object to provide a new and improved speed changing mechanism for motor vehicles which shall be smooth and positive in operation and will eliminate the hand speed change lever in common use, which is an unsightly and generally objectionable feature as ordinarily arranged. In my novel structure I provide a speed selecting lever upon the steering column and connect up the parts in such a manner that the actual shifting of the gears in changing speed is performed by the pedal clutch lever. With these and other objects in view I have devised the novel speed changing mechanism which I will now describe, referring to the accompanying drawings forming a part of this specification and using reference characters to indicate the several parts.

Figure 1 is a view partly in elevation and partly in longitudinal section, showing the installation of my novel speed changing mechanism in a car; Fig. 2 an enlarged detail view showing the speed selecting lever in plan and the steering column in section on the line 2—2 in Fig. 1, looking in the direction of the arrows; Fig. 2ª a section on the line 2ª—2ª in Fig. 1, looking in the direction of the arrows; Fig. 3 a rear elevation of my novel mechanism, that is, as seen from the right in Fig. 1; Fig. 4 a section on the line 4—4 in Fig. 3, looking in the direction of the arrows, the mechanism appearing in plan, in the second speed position; Fig. 5 a side elevation partly in section, the cover plate of the case being removed and the near speed selecting disk in position to produce the second speed, but the operating lever and parts controlled thereby remaining in the normal position and the change speed slide rods in the neutral position; Fig. 6 a side elevation with the cover plate removed, the near speed selecting disk being partly broken away, and the operating lever having been moved to an intermediate position, which has placed the mechanism controlled by the operating lever in position to produce the second speed upon further movement of said lever; Fig. 7 a similar view, the movement of the operating lever having been completed and the parts being in the second speed position, as in Fig. 4; Fig. 8 a section on the line 8—8 in Fig. 7, looking in the direction of the arrows; Fig. 9 a section on the line 9—9 in Fig. 7, looking in the direction of the arrows; Fig. 10 an enlarged perspective view of the head of one of the change speed slide rods; Fig. 11 a perspective view on an enlarged scale of the slotted spring controlled connecting link; Fig. 12 a perspective view of the speed selecting disks and the shaft by which they are carried, and Fig. 13 is an elevation partly broken away, as seen from the left in Fig. 4, but showing the parts in the first speed position.

20 denotes so much of the body of a car as is necessary to illustrate the application thereto of my novel speed changing mechanism, 21 the transmission case, 22 the case of my novel speed changing mechanism, which is rigidly secured in place contiguous to the transmission case, 23 the pedal clutch lever, which is spring controlled in the ordinary or in any preferred manner, 24 and 25 the change speed slide rods, and 26 the steering column.

The mechanism I have illustrated is adapted to produce three speeds forward and a reverse.

27 and 28 denote speed selecting disks carried by a speed selecting disk shaft 29 journaled in case 22, hereinafter referred to as the case. Each of the speed selecting disks is provided with two speed notches. Disk 27 is provided with a notch 30 for the reverse and a notch 31 for first speed, and disk 28 is provided with a notch 32 for the second speed and a notch 33 for the third speed. Change speed slide rods 24 and 25 extend within the case and are provided with heads 34 and 35 respectively. Head 34 is provided on its outer side with bevel nosed catches 36 and 37 which face in opposite directions, and head 35 is provided on its outer side with bevel nosed catches 38 and 39 which face in opposite directions.

40 denotes as a whole a part which is broadly a three-armed bell crank lever. Part 40 comprises a sleeve 41 which is adapted to oscillate on a shaft 42 in the case, a double arm 43 bridged at its outer end as at 55, an arm 44 and a double arm 45.

46 denotes as a whole a part which is broadly a two-armed bell crank lever. Part 46 comprises sleeves 47 and 48 which are adapted to oscillate on operating shaft 49 which is journaled in hubs 50 upon the case, an arm 51 and a triple arm 52, two of the branches of said arm being bridged as at 53, so as to rigidly connect the three branches of arm 52, the two sleeves and arm 51 into a single rigid member.

54 denotes the operating lever which is rigidly secured to the operating shaft, and 56 a double arm having a hub 57 which is keyed to the operating shaft between sleeves 47 and 48. Arm 44 of part 40 and arm 51 of part 46 are connected by a link (in the present instance doubled) 58, and arm 45 of part 40 is connected to arm 56, controlled by the operating lever, by means of a link 59 which is pivoted to arm 56 and is provided with an angle slot 60 through which a pin 61 in arm 45 passes, the slotted end of the link lying between the two branches of arm 45. A spring 68 secured to the link and bearing against sleeve 41 of part 40 between the branches of arm 45 normally acts to force the link downward and to retain the end of the short arm of the angle slot in engagement with pin 61. Co-acting with the link and spring is a boss 69 on the inner face of the case, as will be more fully explained.

62 and 63 denote dogs pivoted to arm 43 of part 40, and 64 and 65 denote dogs pivoted to arm 52 of part 46. These dogs have the general shape of bell crank levers. Each dog is provided with an abutment 66 adapted to be engaged by and to engage one of the bevel nosed catches and with a hub 67 adapted to engage one of the speed notches in a speed selecting disk; thus, bevel nosed catch 36, dog 64 and speed notch 30 in speed selecting disk 27 coöperate in producing the reverse; bevel nosed catch 37, dog 62, and speed notch 31 in speed selecting disk 27 coöperate in producing the first speed; bevel nosed catch 38, dog 65, and speed notch 32 in speed selecting disk 28 coöperate in producing the second speed, and bevel nosed catch 39, dog 63 and speed notch 33 in speed selecting disk 28 coöperate in producing the third speed, as will be more fully explained.

If no speed has been selected by operation of the speed selecting lever, then no speed notch will be in position to receive a hub 67 on a dog, and the hubs of the dogs will engage the peripheries of the speed selecting disks, the effect of which will be to retain the abutments of the dogs tilted downward out of position to engage the corresponding bevel nosed catches and consequently no movement of a change speed slide rod can be produced.

The dogs are retained in operative position by means of springs. Dogs 64 and 65 are each provided with a spring 70 adapted to bear on speed selecting disk shaft 29, and with a spring 71, said springs 71 being adapted to bear respectively on sleeves 47 and 48 of part 46. Springs 70 and 71 act successively. That is to say, spring 71 becomes operative before spring 70 becomes inoperative. Dogs 62 and 63 are each provided with a spring 72 adapted to bear on speed selecting disk shaft 29, and with a spring 73 adapted to bear on sleeve 41 of part 40. Springs 72 and 73 act successively, the same as springs 70 and 71.

The speed selecting disks are controlled from the steering column and the change speed slide rods are connected up with the pedal clutch lever. Near the upper end of the steering column and just under the steering wheel is a quadrant 74 having notches marked from right to left "R, 1st, 2d, 3d," to indicate the reverse and first, second and third speeds.

75 denotes the speed selecting lever, which is rigidly secured to a rod 76 mounted to oscillate in the quadrant and in a plate 77 rigidly secured near the lower end of the steering column. The speed selecting lever carries a catch 78 which is adapted to engage either of the notches in the quadrant to lock the lever in position to produce the reverse or the desired speed forward. Connection with the speed selecting disk shaft may be made in any suitable manner. In the present instance, I have shown rod 76 as provided with an arm 79 and the speed selecting disk shaft as provided with an arm 80, said arms being connected by a link 81.

The pedal clutch lever 23 in addition to its ordinary function (to engage and disengage the clutch, not shown), is connected up to operate the change speed slide rods which have heretofore ordinarily been operated by a change speed hand lever. The pedal clutch lever has formed integral therewith an arm 82 connected by means of a link 83 with operating lever 54. The change speed slide rods reciprocate in a hub 84, which is rigidly secured to case 22 and also to transmission case 21. The rods are held against rotation by means of dowels 85 engaging grooves 86 in the rods. Each change speed slide rod is provided in its under side with three notches indicated by 87, each of which is adapted to be engaged by a spring catch 88, in the present instance a spring controlled ball, socketed in an enlargement of the hub. The action of these catches is to lock the change speed slide rods in their neutral and in both operative positions. For example, in Fig. 5, slide rod 25 is shown as locked in its neutral position by engagement of the catch with the intermediate notch, said rod being locked in the second speed position by engagement of the catch with the inner notch, and in the third speed position by engagement of the catch with the outer notch. The corresponding locking means for change speed slide rod 24 does not appear in the drawings. It will be obvious, however, that engagement of the corresponding catch with the intermediate notch will lock said rod in its neutral position, engagement of the catch with the inner notch will lock the rod in the reverse position, and engagement of the catch with the outer notch will lock the rod in the first speed position.

It should be noted that the action of the operating lever (controlled by the pedal clutch lever) is to swing arm 43 of part 40 and arm 52 of part 46 toward and from each other. These arms swing from the position shown in Fig. 5 to that shown in Fig. 6 and then back to the starting position, as in Fig. 7. If a speed has been selected, one of the dogs, when the parts are in the position shown in Fig. 6, will engage the corresponding bevel nosed catch and further movement will actuate the corresponding change speed slide rod, which, depending upon the speed selected, will be moved outward, as in Fig. 7, or inward, as in Fig. 13. When the pedal clutch lever is actuated, its first effect upon the present mechanism is to return the previously operated change speed slide rod to the neutral position. This is effected by means of arm 43 of part 40 or arm 52 of part 46. These arms are so shaped that some portion thereof will engage the head of each change speed slide rod when in either of its operative positions. For example, in the position of the parts shown in Figs. 4 and 7, head 35 of change speed slide rod 25 will be moved by arm 52 of part 46 from the position shown in Figs. 4 and 7 to its neutral position, as in Fig. 6. Starting with the parts in the neutral position, as in Fig. 5, movement of operating lever 54 will cause, when the parts are in the position shown in Fig. 6, engagement of a bevel nosed catch on the head of change speed slide rod 25 by the corresponding dog. Continued movement of the operating lever to the position in Fig. 7 will place change speed slide rod 25 in the second speed position, as in Figs. 4 and 7. The return movement of operating lever 54 from the position in Fig. 7 to that in Fig. 5 takes place when the operator removes his foot from the pedal clutch lever and the usual clutch spring, not shown, returns it to its normal position. The operating lever is now in the position shown in Fig. 5, but the other parts, except link 59, remain in the position shown in Fig. 7. The next actuation of the pedal clutch lever will cause arm 52 of part 46 to move change speed slide rod 25 to the position shown in Fig. 6, in which position the dog will be disengaged therefrom, and the rod left in its neutral position. Continued movement of the pedal clutch lever (through the operating lever) will now place the parts in operative position at the speed selected. If, however, no speed has been selected by operation of the speed selecting lever and said lever is in a position on the quadrant between two speeds, then no result whatever will follow operation of the pedal clutch lever beyond the placing of the last operated change speed slide rod in the neutral position.

The operation of the mechanism as a whole is as follows: The operator selects the reverse or the desired speed forward by means of speed selecting lever 75, which is placed in alinement with the corresponding notch in the quadrant and locked there by catch 78. Movement of the speed selecting lever through the connections described oscillates speed selecting disk shaft 29 and places one of the speed selecting disks thereon in position to coöperate with the mechanism controlled by the pedal clutch lever in producing the selected speed. In the present instance, for illustration, the second speed has been selected, and in Fig. 2 the speed selecting lever is shown in the second speed position, the effect of which has been to oscillate shaft 29 and place speed selecting disk 28 in the position shown in Figs. 5, 6, and 7, speed notch 32 being in position to receive the hub 67 on dog 65. In Fig. 5, the mechanism controlled by the operating lever (itself controlled by the pedal clutch lever) still remains in the neutral position. The operator now actuates the pedal clutch lever in the usual manner, the effect of which is to swing the operating lever from the position shown in Fig. 5 to that shown in Fig. 7. In Fig. 6, I have shown the parts in an intermediate position. The effect of movement of the operating lever is to actuate parts 40 and 46. The operating lever carries arm 56, which is connected by means of slotted link 59 with arm 45 of part 40, and the movement of part 46 is produced by the connection of arm 44 of part 40 with arm 51 of part 46 by means of link 58. In moving from the position shown in Fig. 5 toward the position shown in Fig. 7, pin 61, which engages angle slot 60 in link 59 will be retained through the action of spring 68 in engagement with the end of the short arm of said slot until after the parts have passed the position shown in Fig. 6. Upon further movement of the operating lever from the position shown in Fig. 6, link 59 will commence to move toward the right and the left end of said link will be swung downward, which places the mid-length of the outer edge of said link in engagement with boss 69 on the case, the effect of which is to raise the link relatively to pin 61, so that said pin will pass out of the short arm of the angle slot, as in Fig. 7.

The effect of operation of the speed selecting lever is to make movement of the car, reverse or forward, as selected, possible. This result is effected through the placing of one of the four speed notches in position to receive the hub 67 of one of the dogs 62 or 63, carried by part 40, or 64 or 65, carried by part 46. The position of the speed notches in the speed selecting disks is such that the hub of one dog only can engage a speed notch at a time, and if no selection of speed is made by the speed selecting lever, the hubs of the dogs will engage the peripheries of the speed selecting disks, the abutments of the dogs will be tilted downward so that they cannot engage the bevel nosed catches, and consequently no movement of the change speed slide rods can be produced and no connection can be effected between the engine and the wheels (not shown, as they form no portion of the present invention.) When the parts reach the position shown in Fig. 6, an abutment 66 upon one of the dogs will be in position to engage the corresponding bevel nosed catch upon one of the change speed slide rods. In the present instance, the operative catch is catch 38 on slide rod 25, the operative dog is dog 65 carried by part 46, and the hub 67 of said dog passes into speed notch 32 in speed selecting disk 28. Each dog, as already explained, is provided with two springs. These springs act normally to retain the dogs in the position shown in Fig. 5. As the parts move toward the position shown in Fig. 6, the abutment of dog 65 will engage the beveled nose of catch 38 and will be forced downward thereby against the power of the operative spring, which will lift the dog upward into engaging position the instant the abutment has passed the catch, as clearly shown in Fig. 6. These springs operate successively. Before one spring passes out of engagement with speed selecting disk shaft 29, the other spring will have passed into engagement with sleeve 47 on the operating shaft, so that there is a continuous spring action to retain the dog in engagement with the catch. As soon as a dog has become engaged with a bevel nosed catch (in the present instance dog 65 has engaged catch 38) continued movement of the parts from the position shown in Fig. 6 toward the position shown in Fig. 7 will actuate the corresponding change speed slide rod, in the present instance rod 25, the effect of which is, through the operation of mechanism, not shown, within the transmission case, to produce forward movement ahead at second speed, the slide rod being locked in operative position by a spring catch 88.

The parts remain in the position just described so long as the operator retains the pedal clutch lever in the operative position. As soon as the pedal clutch lever is released, however, the usual clutch spring (not shown) returns the lever to its normal position as in Fig. 1 and returns the operating lever from the position shown in Fig. 7 to that in Fig. 5. The previously operated change speed slide rod is returned to its neutral position, as previously described, during the first half of the next movement of the pedal clutch lever. This movement is effected without change of position of parts 40 and 46 and the dogs carried thereby. The return movement of the operating lever without effect upon parts 40 and 46 results from the peculiar construction and operation of spring controlled slotted link 59. In the position shown in Fig. 7, pin 61, carried by arm 45 of part 40, is lying at the intersection of the arms of the angle slot in the link. As soon as the return movement of the operating lever commences, arm 56 of said lever will move the link forward and the pin will pass into the long arm of the angle slot, the link being retained in engagement with boss 69 by spring 68. Shortly afterward, arm 56 will raise the link out of engagement with the boss, and spring 68 will force the link downward and again seat the pin at the end of the short arm of the angle slot, in which position it will remain until the operating lever reaches the position shown in Fig. 5.

Suppose now that it is desired to change the speed, for example to the first speed. The operator sets the speed selecting lever at the first speed notch, which places speed notch 31 in speed selecting disk 27 in position to receive the hub 67 of dog 62, and then operates the pedal clutch lever. Before operation of the pedal clutch lever, parts 40 and 46, the dogs and the change speed slide rods were in the position shown in Fig. 7, and the operating lever in the position shown in Fig. 5. Operation of the pedal clutch lever swings operating lever 54 toward the position shown in Fig. 7, and arm 52 of part 46 moves change speed slide rod 25 to the position shown in Fig. 6. As the corresponding speed notch, however, is now not in position to receive the hub of dog 65, said dog will be tilted downward and disengaged from the bevel nosed catch, and simultaneously abutment 66 of dog 62 will engage bevel nosed catch 37 upon change speed slide rod 24. Movement of the operating lever from the position shown in Fig. 6 to that shown in Fig. 7, will carry change speed slide rod 24 to the position shown in Fig. 13, which produces first speed through mechanism, not shown, in the transmission case.

Having thus described my invention I claim:—

1. In combination, a speed selecting disk having speed notches, a change speed slide rod having bevel nosed catches facing in opposite directions, an oscillating part comprising three arms, an oscillating part comprising two arms, spring controlled dogs pivoted to arms of said parts and provided with hubs adapted to engage corresponding notches in the speed selecting disk and abutments adapted to engage corresponding bevel nosed catches and be tilted thereby and then to engage said catches, an operating shaft having an arm, a slotted link connecting said arm with an arm of the three-armed oscillating part, and a link connecting another arm of the three-armed oscillating part with an arm of the two-armed oscillating part, actuation of the operating shaft causing movement of the change speed slide rod to produce a predetermined speed.

2. In combination, speed selecting disks having speed notches, change speed slide rods having bevel nosed catches facing in opposite directions, a three-armed oscillating part, a two-armed oscillating part, dogs pivoted to arms of said parts and provided with hubs adapted to engage corresponding speed notches and abutments adapted to engage corresponding bevel nosed catches and be tilted thereby and then to engage said catches, an operating shaft having an arm, a slotted link connecting said arm with an arm of the three-armed oscillating part, and a link connecting another arm of the three-armed oscillating part with an arm of the two-armed oscillating part.

3. In combination, speed selecting disks having speed notches, a shaft by which they are carried, change speed slide rods having bevel nosed catches facing in opposite directions, a three-armed oscillating part, a two-armed oscillating part, dogs pivoted to arms of said parts and provided with hubs adapted to engage corresponding speed notches and abutments adapted to engage corresponding bevel nosed catches and be tilted thereby and then to engage said catches, an operating shaft having an arm, a slotted link connecting said arm with an arm of the three-armed oscillating part, a link connecting another arm of the three-armed oscillating part with an arm of the two-armed oscillating part, and means for oscillating the speed selecting disk shaft to place a predetermined speed notch in position to be engaged by the hub of the corresponding dog.

4. In combination, speed selecting disks having speed notches, change speed slide rods having bevel nosed catches facing in opposite directions, a three-armed oscillating part, a two-armed oscillating part, dogs pivoted to arms of said parts and provided with hubs adapted to engage corresponding speed notches and abutments adapted to engage corresponding bevel nosed catches and be tilted thereby and then to engage said catches, an operating shaft carrying an arm and an operating lever, a slotted link connecting said arm with an arm of the three-armed oscillating part, a link connecting another arm of the three-armed oscillating part with an arm of the two-armed oscillating part, a pedal clutch lever and operating connections between said lever and the operating lever.

5. In combination, speed selecting disks having speed notches, a shaft by which they are carried, a speed selecting lever, operating connections intermediate said lever and the speed selecting disk shaft, change speed slide rods having bevel nosed catches facing in opposite directions, a three-armed oscillating part, a two-armed oscillating part, dogs pivoted to arms of said parts and provided with hubs adapted to engage corresponding speed notches and abutments adapted to engage corresponding bevel nosed catches and be tilted thereby and then to engage said catches, an operating shaft having an arm, a slotted link connecting said arm with an arm of the three-armed oscillating part, a link connecting another arm of the three-armed oscillating part with an arm of the two-armed oscillating part, a pedal clutch lever and operating connections between said lever and an operating lever.

6. In combination, speed selecting disks having speed notches, a pedal clutch lever, an operating shaft, operating connections between the pedal clutch lever and the shaft, a three-armed oscillating part, a two-armed oscillating part, dogs pivoted to arms of said parts and provided with hubs adapted to engage speed notches to produce different speeds, a connection between the operating lever and the three-armed oscillating part, and a connection between the three-armed oscillating part and the two-armed oscillating part.

7. In combination, speed selecting disks having speed notches, means for adjusting said disks to produce the reverse or a predetermined speed forward, a pedal clutch lever, an operating shaft, operating connections between said lever and said shaft, a two-armed and a three-armed oscillating part, dogs pivoted to arms of said parts and adapted to operatively engage speed notches, a slotted link connecting the operating lever and the three-armed oscillating part and a link connecting the three-armed oscillating part and the two-armed oscillating part.

8. In combination, speed selecting disks having speed notches, a pedal clutch lever having an arm, an operating shaft having an arm, a link connecting said arms, a three-armed oscillating part, a two-armed oscillating part, dogs pivoted to arms of said parts and adapted to operatively engage speed notches, for the purpose set forth, a slotted link connecting the arm of the operating lever and an arm of the three-armed oscillating part, and a link connecting another arm of the three-armed oscillating part and an arm of the two-armed oscillating part.

9. In combination, speed selecting disks having speed notches, means for adjusting said disks to place the speed notch corresponding with the reverse or a predetermined speed forward in operative position, a pedal clutch lever, an operating shaft controlled by the pedal clutch lever, a two-armed and a three-armed oscillating part, dogs pivoted to arms of said parts and adapted to operatively engage speed notches, an operating connection between the operating lever and the three-armed oscillating part, and an operating connection between the three-armed oscillating part and the two-armed oscillating part.

10. In combination, speed selecting mechanism, a pedal clutch lever, an operating shaft controlled by the pedal clutch lever, a two-armed and a three-armed oscillating part controlled by the operating lever, dogs pivoted to arms of said parts and adapted to coöperate with the speed selecting mechanism, and change speed slide rods having bevel nosed catches adapted to coöperate with the dogs, for the purpose set forth.

11. In combination, speed selecting mechanism including disks having speed notches, a pedal clutch lever, an operating shaft controlled by the pedal clutch lever, a two-armed and a three-armed oscillating part controlled by the operating lever, dogs pivoted to arms of said parts and having hubs adapted to engage speed notches to produce predetermined speeds, and abutments, and change speed slide rods having bevel nosed catches adapted to be engaged by the abutments to tilt the dogs, for the purpose set forth, and then to be engaged by the abutments, continued movement of the operating lever causing actuation of the engaged slide rod.

12. In combination, speed selecting mechanism including disks having speed notches, a pedal clutch lever, an operating shaft controlled by the pedal clutch lever, a two-armed and a three-armed oscillating part controlled by the operating lever, dogs pivoted to said parts and adapted to engage speed notches to produce predetermined speeds and change speed slide rods having catches adapted to tilt the dogs, for the purpose set forth, and then to be engaged by the dogs, continued movement of the operating lever causing the actuation of the engaged change speed slide rod.

13. In combination, speed selecting mechanism, a pedal clutch lever, an operating shaft controlled by the pedal clutch lever, a two-armed and a three-armed oscillating part controlled by the operating lever, spring controlled dogs pivoted to arms of said parts and adapted to coöperate with the speed selecting mechanism, and change speed slide rods having catches adapted first to tilt and then to be engaged by the dogs.

14. In combination, speed selecting mechanism, a pedal clutch lever, a two-armed and a three-armed oscillating part controlled by the pedal clutch lever, dogs pivoted to arms of said parts and adapted to coöperate with the speed selecting mechanism, and change speed slide rods each provided with bevel nosed catches facing in opposite directions, each catch being adapted to be engaged by the corresponding dog to move a change speed slide rod from the neutral to an operative position.

15. In combination, speed selecting mechanism, a pedal clutch lever, a two-armed and a three-armed oscillating part controlled by the pedal clutch lever, dogs pivoted to arms of said parts and adapted to coöperate with the speed selecting mechanism, change speed slide rods each provided with bevel nosed catches facing in opposite directions, each catch being adapted to be engaged by the corresponding dog to move a change speed slide rod from the neutral to an operative position, and means for retaining the change speed slide rods in neutral or operative positions.

16. In combination, speed selecting mechanism, a pedal clutch lever, a two-armed and a three-armed oscillating part controlled by the pedal clutch lever, dogs pivoted to arms of said parts and adapted to coöperate with the speed selecting mechanism, change speed slide rods provided with bevel nosed catches facing in opposite directions and springs acting to force the dogs into engagement with the catches, each catch acting first to tilt the corresponding dog from its engaging position.

17. In combination, speed selecting disks having speed notches, a pedal clutch lever, a two-armed and a three-armed oscillating part controlled by the pedal clutch lever, dogs pivoted to arms of said parts and adapted to engage corresponding speed notches, change speed slide rods provided with bevel nosed catches facing in opposite directions, and springs acting to force the dogs into engagement with the catches.

18. In combination, speed selecting disks having speed notches, a pedal clutch lever, a two-armed and a three-armed oscillating part controlled by the pedal clutch lever, spring controlled dogs pivoted to arms of said parts and provided with hubs adapted to engage corresponding speed notches and with abutments, and change speed slide rods provided with bevel nosed catches facing in opposite directions, said catches acting to tilt the dogs out of operative position when engaged by the abutments.

19. In combination, speed selecting disks having speed notches, a pedal clutch lever, change speed slide rods provided with bevel nosed catches facing in opposite directions, a two-armed and a three-armed oscillating part controlled by the pedal clutch lever, dogs pivoted to arms of said parts and adapted to engage the catches and having hubs adapted to engage the speed notches, and means for forcing each dog into engaging position when the corresponding speed notch is in position to receive the hub.

20. In combination, speed selecting mechanism, an oscillating operating shaft having an arm, a two-armed and a three-armed oscillating part, dogs pivoted to arms of said parts and adapted to coöperate with the speed selecting mechanism, for the purpose set forth, a link connecting an arm of the three-armed oscillating part with an arm of the two-armed oscillating part, a link pivoted to the arm of the operating shaft and having an angle slot, a pin in another arm of the three-armed oscillating part engaging the angle slot, and a boss adapted to be engaged by the last mentioned link to raise said link, so that in the return movement of the operating shaft the pin will pass from one arm of the angle slot to the intersection of the arms of said slot and then into the other arm of said slot, said movement causing no movement of the two-armed and three-armed oscillating parts.

21. In combination, speed selecting disks having speed notches, an oscillating operating shaft having an arm, a two-armed and a three-armed oscillating part, dogs pivoted to arms of said parts and having hubs adapted to engage corresponding speed notches, a link connecting an arm of the three-armed oscillating part with an arm of the two-armed oscillating part, a link pivoted to the arm of the operating shaft and having an angular slot, a pin in another arm of the three-armed oscillating part engaging the angle slot, and a boss adapted to be engaged by the last mentioned link to raise said link and permit return movement of the operating shaft without movement of the two-armed and three-armed oscillating parts.

22. In combination, speed selecting mechanism, an oscillating operating shaft having an arm, a two-armed and a three-armed oscillating part, dogs pivoted to arms of said parts and adapted to coöperate with the speed selecting mechanism, a link connecting an arm of the three-armed oscillating part with an arm of the two-armed oscillating part, a link pivoted to the arm of the operating shaft and having an angle slot, a pin in another arm of the three-armed oscillating part engaging the angle slot, a boss adapted to be engaged by the last mentioned link, for the purpose set forth, and a spring acting on said link to retain it in operative position.

23. In combination, speed selecting mechanism, an oscillating operating shaft, a two-armed and a three-armed oscillating part, operating connections between the operating shaft and the two-armed and three-armed oscillating parts, change speed slide rods and dogs pivoted to arms of the oscillating parts and adapted to coöperate with the speed selecting mechanism and with the change speed slide rods, for the purpose set forth.

24. In combination, speed selecting mechanism, an oscillating operating shaft, a two-armed and a three-armed oscillating part, operating connections between the operating shaft and the two-armed and three-armed oscillating parts, change speed slide rods adapted to be engaged by said oscillating parts to return operated slide rods to their neutral position, and dogs pivoted to arms of said oscillating parts and adapted to coöperate with the speed selecting mechanism and with the slide rods to produce predetermined speeds.

25. In combination, speed selecting mechanism, an oscillating operating shaft having an arm, a two-armed and a three-armed oscillating part, a link connecting an arm of the three-armed oscillating part with an arm of the two-armed oscillating part, a link pivoted to the arm of the operating shaft and having an angle slot, a pin in another arm of the three-armed oscillating part engaging the angle slot, a boss adapted to be engaged by the last mentioned link, for the purpose set forth, change speed slide rods adapted to be engaged by the oscillating parts to return operated slide rods to their neutral position, and dogs pivoted to arms of said oscillating parts and adapted to coöperate with the speed selecting mechanism and with the slide rods.

26. In combination, speed selecting mechanism, an oscillating operating shaft having an arm, a two-armed and a three-armed oscillating part, a link connecting an arm of the three-armed oscillating part with an arm of the two-armed oscillating part, a spring controlled link pivoted to the arm of the operating shaft and having an angle slot, a pin in another arm of the three-armed oscillating part engaging the angle slot, a boss adapted to be engaged by the last mentioned link, change speed slide rods adapted to be engaged by the oscillating parts, for the purpose set forth, and spring controlled dogs pivoted to arms of the oscillating parts and adapted to coöperate with the speed selecting mechanism and to engage and actuate the change speed slide rods.

27. In combination, speed selecting disks having speed notches, an oscillating operating shaft having an arm, a two-armed and a three-armed oscillating part, a link connecting an arm of the three-armed oscillating part with an arm of the two-armed oscillating part, a link pivoted to the arm of the operating shaft and having an angle slot, a pin in another arm of the three-armed oscillating part engaging the angle slot, a boss adapted to be engaged by the last mentioned link, change speed slide rods adapted to be engaged by the oscillating parts and provided with bevel nosed catches, and spring controlled dogs pivoted to arms of the oscillating parts and having hubs adapted to engage the speed notches and abutments adapted to engage the bevel nosed catches.

28. In combination, speed selecting disks having speed notches, a pedal clutch lever, an oscillating operating shaft controlled by the pedal clutch lever and having an arm, a two-armed and a three-armed oscillating part, a link connecting an arm of the three-armed oscillating part with an arm of the two-armed oscillating part, a link pivoted to the arm of the operating shaft and having an angle slot, a pin in another arm of the three-armed oscillating part engaging the angle slot, a boss adapted to be engaged by the last mentioned link, change speed slide rods adapted to be engaged by the oscillating parts, for the purpose set forth, and provided with bevel nosed catches, and dogs pivoted to arms of the oscillating parts and adapted to engage the speed notches and also to engage the bevel nosed catches.

29. In combination, speed selecting mechanism, a pedal clutch lever, change speed slide rods, two-armed and three-armed oscillating parts operated by the pedal clutch lever and adapted to engage the slide rods, for the purpose set forth, and dogs pivoted to the oscillating parts and adapted to actuate the slide rods and to coöperate with the speed selecting mechanism in producing predetermined speeds.

30. In combination, speed selecting disks having speed notches, a pedal clutch lever, change speed slide rods having heads provided with bevel nosed catches, two-armed and three-armed oscillating parts operated by the pedal clutch lever and adapted to engage the heads of the slide rods, for the purpose set forth, and dogs pivoted to the oscillating parts and adapted to engage the change speed slide rods and having hubs adapted to engage the corresponding speed notches.

In testimony whereof I affix my signature.

ALFRED C. GRISCOM.